(12) United States Patent
Takenaka et al.

(10) Patent No.: US 8,663,508 B2
(45) Date of Patent: Mar. 4, 2014

(54) PHOTOCHROMIC CURABLE COMPOSITION

(75) Inventors: Junji Takenaka, Shunan (JP); Junji Momoda, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 0 days.

(21) Appl. No.: 13/638,101

(22) PCT Filed: Mar. 28, 2011

(86) PCT No.: PCT/JP2011/058470
§ 371 (c)(1), (2), (4) Date: Sep. 28, 2012

(87) PCT Pub. No.: WO2011/125956
PCT Pub. Date: Oct. 13, 2011

(65) Prior Publication Data
US 2013/0015416 A1    Jan. 17, 2013

(30) Foreign Application Priority Data
Apr. 1, 2010 (JP) ................. 2010-085223

(51) Int. Cl.
F21V 9/00 (2006.01)
G02B 5/02 (2006.01)
G02C 7/10 (2006.01)
G02F 1/361 (2006.01)
G03B 11/00 (2006.01)
A01G 9/14 (2006.01)

(52) U.S. Cl.
USPC ......... 252/582; 252/586; 523/135; 525/330.3

(58) Field of Classification Search
USPC .............. 252/586, 582; 522/71; 525/330.3; 526/319; 544/148; 546/196
See application file for complete search history.

(56) References Cited

U.S. PATENT DOCUMENTS

| | | | |
|---|---|---|---|
| 5,914,174 A | 6/1999 | Gupta et al. | |
| 6,187,444 B1 | 2/2001 | Bowles, III et al. | |
| 6,602,603 B2 | 8/2003 | Welch et al. | |
| 8,066,917 B2 | 11/2011 | Nagoh et al. | |
| 2002/0076549 A1 | 6/2002 | Welch et al. | |
| 2004/0220292 A1 | 11/2004 | Momoda et al. | |
| 2006/0269741 A1 | 11/2006 | Izumi et al. | |
| 2008/0058444 A1* | 3/2008 | Tanaka et al. | 523/135 |
| 2010/0230650 A1 | 9/2010 | Nagoh et al. | |

FOREIGN PATENT DOCUMENTS

| | | |
|---|---|---|
| EP | 1 655 342 A1 | 5/2006 |
| EP | 1 674 460 A1 | 6/2006 |
| EP | 1 714 778 A1 | 10/2006 |
| EP | 1 978 022 A1 | 10/2008 |
| EP | 2 055 698 A1 | 5/2009 |
| JP | 10-231331 A | 9/1998 |
| JP | 2003-342310 A | 12/2003 |
| JP | 2004-78052 A | 3/2004 |
| JP | 2009-244900 A | 10/2009 |
| WO | WO 98/37115 A1 | 8/1998 |
| WO | WO 01/02449 A2 | 1/2001 |
| WO | WO 03/011967 A1 | 2/2003 |
| WO | WO 2009/075388 A1 | 6/2009 |

OTHER PUBLICATIONS

International Search Report issued in PCT/JP2011/058470, mailed on Jun. 28, 2011.
Forms PCT/IPEA/409 and PCT/IB/338.
Extended European Search Report dated Jul. 5, 2013, for Patent Application No. 11765856.7.

* cited by examiner

Primary Examiner — Bijan Ahvazi
(74) Attorney, Agent, or Firm — Birch, Stewart, Kolasch & Birch, LLP

(57) ABSTRACT

A photochromic curable composition comprising 100 parts by mass of polymerizable monomers which include 70 to 100 mass % of polymerizable monomers having two to four (meth)acrylic groups and 0 to 30 mass % of a polymerizable monomer having one (meth)acrylic group and 0.01 to 20 parts by mass of a photochromic compound, wherein
the number of moles of the methacrylic group existent in the polymerizable monomer composition is 3 to 7 times the number of moles of the acrylic group. This composition can provide a lens having a photochromic coating which exhibits excellent photochromic properties, comprises a hard coat layer having sufficiently high adhesion and scratch resistance and has no delay in fading and has excellent storage stability.

5 Claims, No Drawings

PHOTOCHROMIC CURABLE COMPOSITION

TECHNICAL FIELD

The present invention relates to a curable composition which is useful for the production of an optical article having photochromic properties.

BACKGROUND ART

Photochromic eyeglasses serve as sunglasses whose lenses are quickly colored outdoors where they are irradiated by light including ultraviolet radiation like sunlight and as ordinary transparent eyeglass whose lenses are faded indoors where there is no irradiation, and demand for the photochromic eyeglass is growing nowadays.

As for photochromic eyeglass lenses, plastic lenses are particularly preferred from the viewpoints of lightweight and safety, and photochromic properties are generally provided to the above plastic lenses by compounding an organic photochromic compound. As means of compounding the compound, there are known a method in which the surface of a lens having no photochromic properties is imbibed with a photochromic compound (to be referred to as "imbibing method" hereinafter) and a method in which a photochromic compound is dissolved in a polymerizable monomer and the polymerizable monomer is polymerized to obtain a photochromic lens directly (to be referred to as "in-mass method" hereinafter).

In addition to these methods, there is also known a method (to be referred to as "coating method" hereinafter) in which a coating layer having photochromic properties (to be also referred to as "photochromic coating layer" hereinafter) is formed on the surface of a plastic lens by using a coating material containing a photochromic compound (to be also referred to as "photochromic coating material" hereinafter). However, it is not easy to achieve photochromic properties required for photochromic eyeglass lenses only with a thin photochromic coating layer, and most of photochromic lenses which have been put to practical use are manufactured by the imbibing method or the in-mass method.

However, due to the recent development of a photochromic coating material which can meet the above requirement, expectations for the coating method are sharply growing from the excellent feature of the coating method, that is, ability to provide photochromic properties easily to any lens substrate basically. For example, a soft lens substrate into which a photochromic compound is easily diffused must be used in the imbibing method and a special monomer must be used to develop excellent photochromic properties in the in-mass method. In contrast to this, there are no restrictions on the lens substrate in the coating method.

Up till now, a method in which a solution prepared by dissolving a photochromic compound in an urethane oligomer is applied to the surface of a lens substrate and cured has been known as the coating method (refer to WO98/37115). There also has been known a method in which a solution prepared by combining polymerizable monomers having one, two or three or more (meth)acrylic groups in a specific ratio and dissolving a photochromic compound in them is applied to the surface of a lens substrate and cured (refer to U.S. Pat. No. 5,914,174). There further has been known a method in which a solution prepared by dissolving a photochromic compound in a monomer composition comprising two or more polymerizable monomers having two (meth) acrylic groups is applied to the surface of a lens substrate and cured (refer to WO01/02449). There still further has been known a method in which a polymerizable monomer containing a photochromic compound, an amine compound and a radically polymerizable monomer producing a silanol group or a silanol group through hydrolysis and/or a radically polymerizable monomer having an isocyanate group is applied to the surface of a lens substrate and cured (refer to WO03/11967).

However, according to the method described in WO98/37115, since the crosslinking density of the obtained photochromic coating layer is low, the temperature dependence of photochromic properties is large and the photochromic compound may be dissolved into the hard coat solution when a hard coat layer is to be formed on the photochromic coating layer. Thus, there is room for improvement. According to the methods described in U.S. Pat. No. 5,914,174 and WO01/02449, as the photochromic properties are unsatisfactory and further adhesion between the photochromic coating layer and the hard coat layer is unsatisfactory, a special pretreatment such as plasma treatment must be carried out to form the hard coat layer. Therefore, there is room for improvement.

Meanwhile, the method described in WO03/11967 is an excellent method because the photochromic coating layer has sufficiently high adhesion and sufficiently high scratch resistance without carrying out a special pretreatment such as plasma treatment even when a hard coat layer is to be formed on the photochromic coating layer and exhibits excellent photochromic properties.

However, according to the method disclosed in WO03/11967, there is possibility that the storage stability of the photochromic curable composition may degrade. It is considered that this depends on the type and content of the polymerizable monomer in use. Further, depending on the storage state, there may arise problems that it is difficult to coat an optical substrate due to an increase in viscosity, photochromic properties deteriorate, and adhesion to the hard coat layer becomes unsatisfactory. Therefore, there is room for improvement.

According to the method disclosed in WO03/11967, an optical article having a photochromic coating layer exhibits excellent photochromic properties such as high color optical density and high fading speed at the beginning. It is considered that this depends on the type and content of the polymerizable monomer in the photochromic curable composition. However, there may occur a phenomenon that as the optical article is used for a longer time, the fading speed becomes slower (to be referred to as "delay in fading" hereinafter). Therefore, there is room for improvement.

DISCLOSURE OF THE INVENTION

It is therefore an object of the present invention to provide a photochromic curable composition from which a lens (optical material) having a photochromic coating exhibiting excellent photochromic properties such as high color optical density and high fading speed and comprising a hard coat layer with sufficiently high adhesion and scratch resistance and having little delay in fading can be manufactured and which has excellent storage stability.

The inventors of the present invention conducted intensive studies to attain the above object. First of all, they studied photochromic curable compositions comprising various types of polymerizable monomers and a photochromic compound and found that a lens having a photochromic coating which has little delay in fading and a photochromic curable composition having excellent storage stability are obtained by adjusting the number of (meth)acrylic groups in the molecules of polymerizable monomers and the contents of the polymerizable monomers. They further studied a photochromic curable composition which exhibits excellent photochromic properties and obtains sufficiently high adhesion and has high scratch resistance when a hard coat layer is formed on a photochromic layer. As a result, they found that the above object can be attained by a photochromic curable composition which comprises polymerizable monomers having a specific number of (meth)acrylic groups in the molecule and has a specific ratio of the number of moles of the methacrylic group and the number of moles of the acrylic group in a polymerizable composition containing the polymerizable monomers. The present invention was accomplished based on this finding.

That is, the first invention is a photochromic curable composition comprising (I) 100 parts by mass of (meth)acrylic polymerizable monomers and (II) 0.01 to 20 parts by mass of a photochromic compound, wherein 100 parts by mass of the (meth)acrylic polymerizable monomers consist of (Ia) 70 to 100 parts by mass of a polyfunctional polymerizable monomer having two to four (meth)acrylic groups in one molecule and (Ib) 0 to 30 parts by mass of a monofunctional polymerizable monomer having one (meth)acrylic group in one molecule; and the methacrylic group and the acrylic group in the (meth)acrylic polymerizable monomers are existent to ensure that the number of moles of the methacrylic group is 3 to 7 times the number of moles of the acrylic group.

The (meth)acrylic group means a methacrylic group or an acrylic group. The polyfunctional polymerizable monomers having two to four (meth)acrylic groups in one molecule means polyfunctional polymerizable monomers having two to four methacrylic groups or acrylic groups in one molecule.

In the first invention, preferably, the polyfunctional polymerizable monomer (Ia) consists of 50 to 99 mass % of a bifunctional polymerizable monomer having two (meth)acrylic groups, 1 to 50 mass % of a trifunctional polymerizable monomer having three (meth)acrylic groups and 0 to 49 mass % of a tetrafunctional polymerizable monomer having four (meth)acrylic groups (the total of the bifunctional polymerizable monomer, the trifunctional polymerizable monomer and the tetrafunctional polymerizable monomer is 100 mass %). Further, the above photochromic compound (II) preferably contains a compound having an indeno[2,1-f]naphtho[1,2-b]pyran skeleton.

The second invention is a coating material comprising the above photochromic curable composition, and the third invention is an optical material having photochromic properties, wherein a layer composed of a cured product of the photochromic curable composition of the above invention is formed on at least one side of an optical substrate. Further, the fourth invention is a photochromic cured product obtained by curing the above curable composition.

BEST MODE FOR CARRYING OUT THE INVENTION

A description is first given of the polyfunctional polymerizable monomers having two to four (meth)acrylic groups in one molecule (Ia) used in the photochromic curable composition of the present invention.

In the photochromic curable composition of the present invention, the (meth)acrylic polymerizable monomers include polyfunctional polymerizable monomers having two to four (meth)acrylic groups in one molecule as the main components. As the polyfunctional polymerizable monomers may be used known polymerizable monomers, especially polymerizable monomers used in plastic lenses. These polyfunctional polymerizable monomers may be polymerizable monomers having both methacrylic groups and acrylic groups in one molecule. In consideration of the acquisition ease of the polymerizable monomers and the effect of the obtained cured product, it is preferred in the present invention that polymerizable monomers having the same functional groups in one molecule should be used in combination. That is, it is preferred that a polyfunctional polymerizable monomer having acrylic groups in one molecule and a polyfunctional polymerizable monomer having methacrylic groups in one molecule should be used in combination and optionally with a monofunctional monomer which will be described hereinafter and that the number of moles of the methacrylic group and the number of moles of the acrylic group should be set to specific ranges in the (meth)acrylic polymerizable monomers including these polyfunctional polymerizable monomers.

(Polyfunctional Polymerizable Monomer Having Two (Meth)Acrylic Groups in One Molecule)

As the bifunctional polymerizable monomer having two (meth)acrylic groups in one molecule may be used a bifunctional polymerizable monomer represented by the following formula (1).

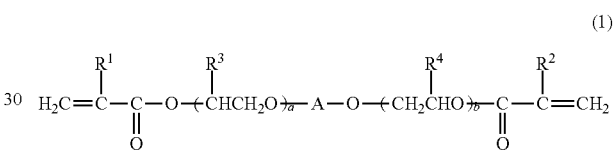

In the above formula (1), $R^1$, $R^2$, $R^3$ and $R^4$ are each independently a hydrogen atom or a methyl group.

In the above formula, A is a divalent organic group having 2 to 20 carbon atoms. Preferred examples of A include alkylene groups such as ethylene group, propylene group, butylene group and nonylene group; halogen atoms such as chlorine atom, fluorine atom and bromine atom; phenylene groups substituted by an alkyl group having 1 to 4 carbon atoms; nonsubstituted phenylene groups; and groups represented by the following formula:

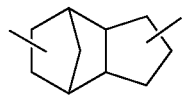

groups represented by the following formula:

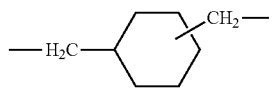

and groups represented by the following formula:

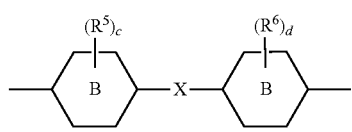

(in the above formula, $R^5$ and $R^6$ are each independently an alkyl group having 1 to 4 carbon atoms, chlorine atom or bromine atom, "c" and "d" are each independently an integer of 0 to 4, a ring represented by the following formula is a benzene ring or a cyclohexane ring:

when the ring represented by the following formula:

is a benzene ring, X is any one of —O—, —S—, —S(O$_2$)—, —C(O)—, —CH$_2$—, —CH═CH—, —C(CH$_3$)$_2$— and —C(CH$_3$)(C$_6$H$_5$)—, or a group represented by the following formula:

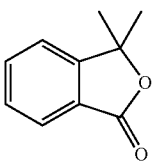

and when the ring represented by the following formula:

is a cyclohexane ring, X is any one of —O—, —S—, —CH$_2$— and —C(CH$_3$)$_2$—.

The bifunctional polymerizable monomer having two (meth)acrylic groups in one molecule represented by the above formula (1) is effective in securing the hardness of the obtained photochromic cured product and improving photochromic properties, especially color optical density.

The bifunctional polymerizable monomer of the above formula is obtained as a mixture of molecules having different molecular weights. Therefore, the values of "a" and "b" are average values. To obtain the above effect, preferably, "a" is 0 to 20, "b" is 0 to 20, and (a+b) is 0 to 20. (a+b) is particularly preferably 2 to 15.

It is particularly preferred from the viewpoint of obtaining a higher effect that a polymerizable monomer having acrylic groups should be used when (a+b) is 0 or more to less than 8, a polymerizable monomer having acrylic groups or methacrylic groups should be used when (a+b) is 8 or more to less than 15, and a polymerizable monomer having methacrylic groups should be used when (a+b) is 16 or more as the polymerizable monomer having two (meth)acrylic groups.

Examples of the bifunctional polymerizable monomer represented by the above formula (1) which can be advantageously used include 1,4-butanediol dimethacrylate, 1,6-hexanediol dimethacrylate, 1,9-nonanediol dimethacrylate, 1,10-decanediol dimethacrylate, neopentyl glycol dimethacrylate, 2,2-bis[4-methacryloxy(polyethoxy)phenyl]propane ((a+b) is 2.3), 2,2-bis[4-methacryloxy(polyethoxy)phenyl]propane ((a+b) is 2.6), 2,2-bis[4-methacryloxy(polyethoxy)phenyl]propane ((a+b) is 4), 2,2-bis[4-methacryloxy(polyethoxy)phenyl]propane ((a+b) is 10), 2,2-bis[4-methacryloxy(polyethoxy)phenyl]propane ((a+b) is 20), tricyclodecanedimethanol dimethacrylate, 1,6-hexanediol diacrylate, 1,9-nonanediol diacrylate, 1,10-decanediol diacrylate, neopentyl glycol diacrylate, tricyclodecanedimethanol diacrylate, dioxane glycol diacrylate, ethoxylated cyclohexanedimethanol diacrylate ((a+b) is 4), 2,2-bis[4-acryloxy(polyethoxy)phenyl]propane ((a+b) is 3), 2,2-bis[4-acryloxy(polyethoxy)phenyl]propane ((a+b) is 4), 2,2-bis[4-acryloxy(polyethoxy)phenyl]propane ((a+b) is 10) and 2,2-bis[4-acryloxy(polyethoxy)phenyl]propane ((a+b) is 20).

Out of these, a bifunctional polymerizable monomer of the above formula (1) in which A has a skeleton represented by the following formula is preferred because especially high color optical density is obtained.

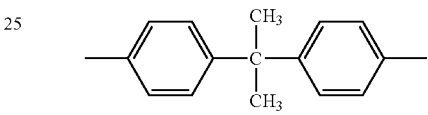

Particularly preferred examples of the bifunctional polymerizable monomer include bifunctional polymerizable monomers having acrylic groups of the formula (1) in which (a+b) is 0 or more to less than 8, such as 2,2-bis[4-acryloxy(polyethoxy)phenyl]propane ((a+b) is 4), bifunctional polymerizable monomers having acrylic groups of the formula (1) in which (a+b) is 8 or more to less than 15, such as 2,2-bis[4-acryloxy(polyethoxy)phenyl] propane ((a+b) is 10), bifunctional polymerizable monomers having methacrylic groups of the formula (1) in which (a+b) is 8 or more to less than 15, such as 2,2-bis[4-methacryloxy(polyethoxy)phenyl]propane ((a+b) is 10) and bifunctional polymerizable monomers having methacrylic groups of the formula (1) in which (a+b) is 16 or more, such as 2,2-bis[4-methacryloxy(polyethoxy)phenyl]propane ((a+b) is 20).

These polymerizable monomers having two (meth)acrylic groups in one molecule may be used alone or in combination of two or more.

Further, another preferred polymerizable monomer having two (meth)acrylic groups in one molecule represented by the following formula (2) may be used.

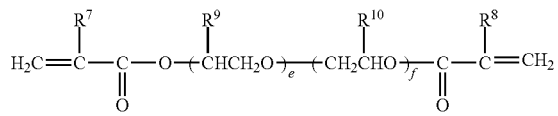

In the above formula, $R^7$, $R^8$, $R^9$ and $R^{10}$ are each independently a hydrogen atom or a methyl group.

The bifunctional polymerizable monomer having two (meth)acrylic groups in one molecule represented by the above formula (2) is effective in improving the photochromic properties, especially color optical density of the obtained photochromic cured product when the obtained photochromic composition is used as a coating material. Further, it is also effective in adjusting the viscosity of the coating material.

The above bifunctional polymerizable monomer is generally obtained as a mixture of molecules having different molecular weights. Therefore, the values of "e" and "f" are average values. To obtain the above effect, preferably, "e" is 0 to 25, "f" is 0 to 25, and (e+f) is 1 to 25. (e+f) is particularly preferably 3 to 15.

It is particularly preferred from the viewpoint of obtaining a higher effect that a polymerizable monomer having acrylic groups should be used when (e+f) is 1 or more to less than 8, a polymerizable monomer having acrylic groups or methacrylic groups should be used when (e+f) is 8 or more to less than 15, and a polymerizable monomer having methacrylic groups should be used when (e+f) is 16 or more as the polymerizable monomer having two (meth)acrylic groups in one molecule.

Examples of the polymerizable monomer having two (meth)acrylic groups represented by the above formula (2) include ethylene glycol dimethacrylate, diethylene glycol dimethacrylate, triethylene glycol dimethacrylate, tetraethylene glycol dimethacrylate, polyethylene glycol dimethacrylate (the average number (e+f) of recurring ethyleneoxy groups is 9, average molecular weight is 536), polyethylene glycol dimethacrylate (the average number (e+f) of recurring ethyleneoxy groups is 14, average molecular weight is 736), polyethylene glycol dimethacrylate (the average number (e+f) of recurring ethyleneoxy groups is 23, average molecular weight is 1136), tripropylene glycol dimethacrylate, tetrapropylene glycol dimethacrylate, polypropylene glycol dimethacrylate (the average number (e+f) of recurring propyleneoxy groups is 9, average molecular weight is 662), ethylene glycol diacrylate, diethylene glycol diacrylate, triethylene glycol diacrylate, tetraethylene glycol diacrylate, polyethylene glycol diacrylate (the average number (e+f) of recurring ethyleneoxy groups is 9, average molecular weight is 508), polyethylene glycol diacrylate (the average number (e+f) of recurring ethyleneoxy groups is 14, average molecular weight is 708), dipropylene glycol diacrylate, tripropylene glycol diacrylate, tetrapropylene glycol diacrylate, polypropylene glycol diacrylate (the average number (e+f) of recurring propyleneoxy groups is 7, average molecular weight is 536) and polypropylene glycol diacrylate (the average number (e+f) of recurring propyleneoxy groups is 12, average molecular weight is 808).

Particularly preferred examples thereof include polymerizable monomers having acrylic groups of the formula (2) in which (e+f) is 0 or more to less than 8, such as tetraethylene glycol diacrylate, polymerizable monomers having acrylic groups of the formula (2) in which (e+f) is 8 or more to less than 15, such as polyethylene glycol diacrylate (the average number (e+f) of recurring ethyleneoxy groups is 9, average molecular weight is 508), polymerizable monomers having methacrylic groups of the formula (2) in which (e+f) is 8 or more to less than 15, such as polyethylene glycol dimethacrylate (the average number (e+f) of recurring ethyleneoxy groups is 9, average molecular weight is 536) and polyethylene glycol dimethacrylate (the average number (e+f) of recurring ethyleneoxy groups is 14, average molecular weight is 736).

As the polyfunctional polymerizable monomer having two (meth)acrylic groups in one molecule may be further used a polyfunctional urethane(meth)acrylate having two (meth) acrylic groups in one molecule which will be described hereinafter.

These polymerizable monomers having two (meth)acrylic groups in one molecule may be used alone or in combination of two or more.

(Polyfunctional Polymerizable Monomer Having Three to Four (Meth)Acrylic Groups in One Molecule)

The polyfunctional polymerizable monomer having three to four (meth)acrylic groups in one molecule may be a polyfunctional polymerizable monomer having acrylic groups and methacrylic groups in one molecule but preferably a polymerizable monomer having only the same functional groups (acrylic groups or methacrylic groups) in one molecule as described above.

As the polyfunctional polymerizable monomer may be used a polyfunctional polymerizable monomer represented by the following formula (3).

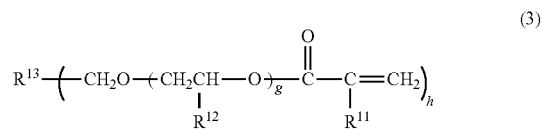

(3)

In the above formula, $R^{11}$ and $R^{12}$ are each independently a hydrogen atom or a methyl group. $R^{13}$ is a trivalent or tetravalent organic group having 1 to 10 carbon atoms, "g" is an average number of 0 to 3, and "h" is an integer of 3 or 4. The above trivalent or tetravalent organic group having 1 to 10 carbon atoms represented by $R^{13}$ does not have a urethane bond.

The polyfunctional polymerizable monomer having three to four (meth)acrylic groups in one molecule represented by the above formula (3) is effective in securing the hardness of the obtained photochromic cured product and improving photochromic properties, especially color optical density and fading speed.

A polyfunctional polymerizable monomer having three (meth)acrylic groups is more preferred than a polyfunctional polymerizable monomer having four (meth)acrylic groups because especially high color optical density and fading speed are obtained. Further, a polyfunctional polymerizable monomer having methacrylic groups is preferably used because especially high color optical density and fading speed are obtained.

Examples of the polyfunctional polymerizable monomer having three to four (meth)acrylic groups represented by the above formula (3) include trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolopropane triethylene glycol trimethacrylate, trimethylolpropane triethylene glycol triacrylate, ditrimethylolpropane tetramethacrylate, ditrimethylolpropane tetraacrylate and polyester oligomers having four (meth)acrylic groups. The "tetramethylolmethane" in the above compounds may be represented by trivial name "pentaerythritol".

Out of these, trimethylolpropane trimethacrylate is particularly preferred. These polymerizable monomers having three to four (meth)acrylic groups in one molecule may be used alone or in combination of two or more.

As the polymerizable monomer having three to four (meth) acrylic groups in one molecule may be used a polyfunctional urethane (meth)acrylate having three to four (meth)acrylic groups in one molecule.

(Polyfunctional Urethane(Meth)Acrylate Having Two to Four (Meth)Acrylic Groups in One Molecule)

In the present invention, a polyfunctional urethane(meth) acrylate having two to four (meth)acrylic groups in one molecule may be advantageously used. This polyfunctional urethane(meth)acrylate is not particularly limited and a known urethane(meth)acrylate may be used. Although a polyfunctional polymerizable monomer having both acrylic groups and methacrylic groups in one molecule may be used, it is preferred to use a combination of polymerizable monomers having the same functional groups in one molecule in the present invention as described above.

This polyfunctional urethane(meth)acrylate having two to four (meth)acrylic groups is effective in securing the strength of the obtained photochromic cured product.

Polyfunctional urethane(meth)acrylates are roughly divided into urethane(meth)acrylates having an aromatic ring such as a benzene ring in the molecular structure and urethane (meth)acrylates having no aromatic ring. In the present invention, all of them may be used but urethane(meth)acrylates which do not have an aromatic ring and do not yellow are particularly preferably used from the viewpoint of the light resistance of a cured product.

Examples of the polyfunctional urethane(meth)acrylate include urethane(meth)acrylates which are reaction mixtures obtained by reacting 2-hydroxyethyl(meth)acrylate which may have an alkylene oxide chain with an urethane prepolymer prepared by reacting hexamethylene diisocyanate, isophorone diisocyanate, lysine isocyanate, 2,2,4-trimethylhexamethylene diisocyanate, dimeric acid isocyanate, isopropylidene bis-4-cyclohexyl isocyanate, dicyclohexylmethane diisocyanate, norbornene diisocyanate or methylcyclohexane diisocyanate with a low-molecular weight polyfunctional polyol such as a polyalkylene glycol having a recurring unit such as ethylene oxide, propylene oxide or hexamethylene oxide having two to four carbon atoms, a polyester diol exemplified by polycaprolactone diol, polycarbonate diol and polybutadiene diol, or a known low molecular-weight polyol such as ethylene glycol, propylene glycol, 1,3-propanediol, 1,4-butanediol, 1,5-pentanediol, 1,6-hexanediol, 1,8-octanediol, 1,9-nonanediol, neopentyl glycol, diethylene glycol, dipropylene glycol, 1,4-cyclohexane diol, 1,4-cyclohexane dimethanol, glycerin, trimethylolpropane or pentaerythritol, or reaction mixtures obtained by directly reacting the above diisocyanate with 2-hydroxyethyl(meth) acrylate which may have an alkylene oxide chain and which have a molecular weight of 400 or more to less than 20,000.

(Preferred Combination of Polyfunctional Polymerizable Monomers Having Two to Four (Meth)Acrylic Groups in One Molecule)

In the photochromic curable composition of the present invention, the number of moles of the methacrylic group and the number of moles of the acrylic group existent in the composition can be set to specific ranges by combining the polyfunctional polymerizable monomers having two to four (meth)acrylic groups in one molecule listed above and optionally a monofunctional polymerizable monomer which will be described hereinafter.

In the photochromic curable composition of the present invention, the (meth)acrylic polymerizable monomers can be formed only of the above polyfunctional polymerizable monomers. It is preferred that the polyfunctional polymerizable monomers should consist of 50 to 99 mass % of a bifunctional polymerizable monomer having two (meth)acrylic groups, 1 to 50 mass % of a trifunctional polymerizable monomer having three (meth)acrylic groups and 0 to 49 mass % of a tetrafunctional polymerizable monomer having four (meth)acrylic groups (the total of the bifunctional polymerizable monomer, the trifunctional polymerizable monomer and the tetrafunctional polymerizable monomer is 100 mass %). By setting the contents of these monomers to the above ranges, a photochromic cured product having high photochromic properties and little delay in fading can be obtained. To obtain the above effect, it is more preferred that the bifunctional polymerizable monomer having two (meth) acrylic groups, the trifunctional polymerizable monomer having three (meth)acrylic groups and the tetrafunctional polymerizable monomer having four (meth)acrylic groups should be contained in amounts of 60 to 80 mass %, 20 to 40 mass % and 0 to 20 mass %, respectively (the total of the bifunctional polymerizable monomer, the trifunctional polymerizable monomer and the tetrafunctional polymerizable monomer is 100 mass %).

As for preferred examples of the above polyfunctional polymerizable monomers, the bifunctional polymerizable monomer is preferably a bifunctional polymerizable monomer of the above formula (1) in which A has a skeleton represented by the following formula or a bifunctional polymerizable monomer of the above formula (2) in which (e+f) is 3 to 15.

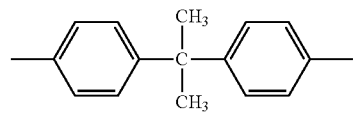

The trifunctional to tetrafunctional polymerizable monomers are preferably a combination of polymerizable monomers of the above formula (3) in which "h" is 3. Specific examples of the bifunctional polymerizable monomer include 2,2-bis[4-acryloxy(polyethoxy)phenyl]propane ((a+b) is 4), 2,2-bis[4-acryloxy(polyethoxy)phenyl]propane ((a+b) is 10), 2,2-bis[4-methacryloxy(polyethoxy)phenyl]propane ((a+b) is 10), 2,2-bis[4-methacryloxy(polyethoxy) phenyl]propane ((a+b) is 20), tetraethylene glycol diacrylate, polyethylene glycol diacrylate (the average number (e+f) of recurring ethyleneoxy groups is 9, average molecular weight is 508), polyethylene glycol diacrylate (the average number (e+f) of recurring ethyleneoxy groups is 9, average molecular weight is 536) and polyethylene glycol dimethacrylate (the average number (e+f) of recurring ethyleneoxy groups is 14, average molecular weight is 736). Examples of the trifunctional to tetrafunctional polymerizable monomer include trimethylolpropane trimethacrylate.

Although the photochromic curable composition of the present invention comprises the above polyfunctional polymerizable monomers and the photochromic compound, the (meth)acrylic polymerizable monomers must include 70 parts or more by mass of the above polyfunctional polymerizable monomers. The (meth)acrylic polymerizable monomers may include (Ib) a monofunctional polymerizable monomer having one (meth)acrylic group in one molecule besides the above polyfunctional polymerizable monomers. The content of the monofunctional polymerizable monomer in the total of the (meth)acrylic polymerizable monomers must be 0 to 30 parts by mass. The total of the above (Ia) the above polyfunctional polymerizable monomers and (Ib) the monofunctional polymerizable monomer is 100 parts by mass.

When the total content of the polyfunctional polymerizable monomers is less than 70 parts by mass, photochromic properties are greatly affected by temperature, color optical density tends to lower at a high temperature, and satisfactory scratch resistance cannot be obtained even when a hard coat layer is formed.

(Ib) Monofunctional Polymerizable Monomer Having One (Meth)Acrylic Group in One Molecule The photochromic curable composition of the present invention may comprise (Ib) a monofunctional polymerizable monomer having one (meth)acrylic group in one molecule in addition to the above polyfunctional polymerizable monomers (Ia). This monofunctional polymerizable monomer (Ib) is not particularly limited and a known compound, especially a compound which is used in plastic lenses may be advantageously used.

The preferred monofunctional polymerizable monomer is represented by the following formula (4).

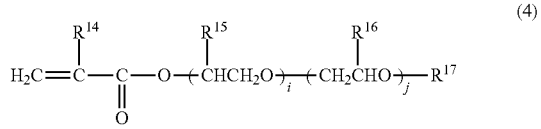

In the above formula, $R^{14}$, $R^{15}$ and $R^{16}$ are each independently a hydrogen atom or a methyl group.

$R^{17}$ is a hydrogen atom, alkyl group having 1 to 20 carbon atoms, cycloalkyl group having 6 to 20 carbon atoms, phenyl group which may or may not be substituted by an alkyl group having 1 to 20 carbon atoms, naphthyl group which may or may not be substituted by an alkyl group having 1 to 20 carbon atoms, or glycidyl group.

The monofunctional polymerizable monomer represented by the above formula (4) is generally obtained as a mixture of molecules having different molecular weights. Therefore, "i" and "j" are average values. In the monofunctional polymerizable monomer, preferably, "i" is 0 to 25, "j" is 0 to 25, and (i+j) is 0 to 25. (i+j) is particularly preferably 0 to 15.

Specific examples of the monofunctional polymerizable monomer (Ib) which can be particularly advantageously used include methoxydiethylene glycol methacrylate, methoxytetraethylene glycol methacrylate, methoxypolyethylene glycol methacrylate (the average number (i+j) of recurring ethyleneoxy groups is 9, average molecular weight is 468), methoxypolyethylene glycol methacrylate (the average number (i+j) of recurring ethyleneoxy groups is 23, average molecular weight is 1068), isostearyl methacrylate, isobornyl methacrylate, phenoxyethylene glycol methacrylate, phenoxyethyl acrylate, phenoxydiethylene glycol acrylate, phenoxypolyethylene glycol acrylate (the average number (i+j) of recurring ethyleneoxy groups is 6, average molecular weight is 412), naphthoxyethylene glycol acrylate, isostearyl acrylate, isobornyl acrylate and glycidyl methacrylate. These polymerizable monomers having one (meth)acrylic group in one molecule may be used in combination of two or more.

Further, another monofunctional polymerizable monomer having one (meth)acrylic group in one molecule represented by the following formula (5) may be used besides the above monofunctional polymerizable monomer represented by the above formula (4).

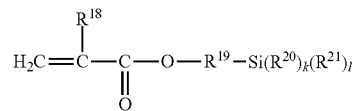

In the above formula, $R^{18}$ is a hydrogen atom or a methyl group.

$R^{19}$ is an alkylene group having 1 to 10 carbon atoms, $R^{20}$ is an alkoxy group having 1 to 6 carbon atoms, and $R^{21}$ is an alkyl group having 1 to 6 carbon atoms. "k" is an integer of 1 to 3, "l" is an integer of 0 to 2, and (k+l) is 3.

Examples of the alkylene group having 1 to 10 carbon atoms include ethylene group, propylene group and butylene group, examples of the alkoxy group having 1 to 6 carbon atoms include methoxy group, ethoxy group and propoxy group, and examples of the alkyl group having 1 to 6 carbon atoms include methyl group, ethyl group and propyl group.

Specific examples of the polymerizable monomer represented by the above formula (5) which may be advantageously used include γ-methacryloyloxypropyl trimethoxysilane, γ-methacryloyloxypropyl triethoxysilane, γ-methacryloyloxypropylmethyl dimethoxysilane, γ-acryloyloxypropyl trimethoxysilane, γ-acryloyloxypropyl triethoxysilane and γ-acryloyloxypropylmethyl dimethoxysilane. In the present invention, polymerizable monomers having one (meth)acrylic group in one molecule may be used alone or in combination of two or more.

Out of these monofunctional polymerizable monomers (Ib), monofunctional polymerizable monomers of the above formula (4) in which (i+j) is 0 to 3 and $R^{17}$ is a glycidyl group or monofunctional polymerizable monomers of the above formula (5) in which $R^{19}$ is an alkylene group having 1 to 4 carbon atoms, $R^{20}$ is an alkoxy group having 1 to 3 carbon atoms, and $R^{21}$ is an alkyl group having 1 to 3 carbon atoms are preferably used because the temperature dependence of photochromic properties is not so high and adhesion between the photochromic coating layer and the hard coat layer can be improved. Specific examples of these compounds include glycidyl methacrylate, glycidyl acrylate and γ-methacryloyloxypropyl trimethoxysilane.

The monofunctional polymerizable monomer (Ib) in the photochromic curable composition of the present invention serves to improve adhesion between the photochromic coating layer and the hard coat layer and the repeat durability of photochromic properties. The (meth)acrylic polymerizable monomers include 70 to 100 parts by mass of the above polyfunctional polymerizable monomers (polymerizable monomer composition) (Ia) and 0 to 30 parts by mass of the above monofunctional polymerizable monomer (Ib) as described above. To produce the effect of the above monofunctional polymerizable monomer (Ib) more while the influence upon photochromic properties of temperature is suppressed and scratch resistance is retained when the hard coat layer is formed, preferably, the total content of the polyfunctional polymerizable monomers (Ia) and the content of the above monofunctional polymerizable monomer (Ib) are set to 85 to 99 parts by mass and 1 to 15 parts by mass, respectively. More preferably, the total content of the polyfunctional polymerizable monomers (Ia) and the content of the above monofunctional polymerizable monomer (Ib) are set to 90 to 99 parts by mass and 1 to 10 parts by mass, respectively.

A description is subsequently given of the number of moles of the methacrylic group and the number of moles of the acrylic group contained in the (meth)acrylic polymerizable monomers.

(Number of Moles of Methacrylic Group and Number of Moles of Acrylic Group)

In the present invention, the number of moles of the methacrylic group and the number of moles of the acrylic group contained in the (meth)acrylic polymerizable monomers must be set to specific ranges. Stated more specifically, the number of moles of the methacrylic group existent in the (meth)acrylic polymerizable monomers must be 3 to 7 times the number of moles of the acrylic group. When the number of moles of the methacrylic group and the number of moles of the acrylic group satisfy the above range, the obtained cured product exhibits excellent photochromic properties and further excellent adhesion and scratch resistance when a hard coat layer is formed on the cured product. To produce this effect more, the number of moles of the methacrylic group existent in the (meth)acrylic polymerizable monomers is preferably 3.5 to 6.5 times, more preferably 4 to 6 times the number of moles of the acrylic group.

A photochromic curable composition obtained by using a (meth)acrylic polymerizable monomers in which the number of moles of the methacrylic group is less than 3 times the number of moles of the acrylic group has great temperature dependence of photochromic properties disadvantageously. When a hard coat layer is formed on a photochromic coating layer formed from the curable composition, the scratch resistance of the hard coat layer becomes unsatisfactory disadvantageously. A photochromic curable composition in which the number of moles of the methacrylic group is more than 7 times the number of moles of the acrylic group sees the deterioration of photochromic properties such as slow fading speed disadvantageously. Further, adhesion between the photochromic coating layer formed from the curable composition and the hard coat layer becomes unsatisfactory with the result that a photochromic cured product having an excellent effect cannot be obtained disadvantageously.

The ratio of the number of moles of the methacrylic group and the number of moles of the acrylic group existent in the (meth)acrylic polymerizable monomers can be calculated as follows. Stated more specifically, the number of moles of the methacrylic group and the number of moles of the acrylic group are first calculated by the following method.

Number of moles of methacrylic group=Σ{(mass of polymerizable monomer having methacrylic groups)÷(its molecular weight)×(number of its functional groups)}

Number of moles of acrylic group=Σ{(mass of polymerizable monomer having acrylic groups)÷(its molecular weight)×(number of its functional groups)}

In the above equations, Σ represents the sum when a plurality of monomers were used as the polymerizable monomer. When a mixture of the (meth)acrylic polymerizable monomers is used, the above molecular weight is the average molecular weight of the mixture. For example, when a mixture of the polyfunctional polymerizable monomers represented by the above formula (1) is used, the molecular weight is obtained from the average value of (a+b). The ratio of the number of moles of the methacrylic group and the number of moles of the acrylic group existent in the (meth)acrylic polymerizable monomers can be obtained by dividing the calculated number of moles of the methacrylic group by the calculated number of moles of the acrylic group.

As a matter of course, when the (meth)acrylic polymerizable monomers consist of only the above polyfunctional polymerizable monomers (Ia), the number of moles of the methacrylic group and the number of moles of the acrylic group existent in the polyfunctional polymerizable monomers should be calculated based on the above equations. When the monofunctional polymerizable monomer (Ib) is contained, the number of moles of the methacrylic group and the number of moles of the acrylic group contained in the polyfunctional polymerizable monomers and the monofunctional polymerizable monomer should be calculated.

A description is subsequently given of the photochromic compound.

(II) Photochromic Compound

A compound which exhibits a photochromic function can be used as the photochromic compound. For example, photochromic compounds such as fulgide compounds, chromene compounds and spirooxazine compounds are well known and may be used in the present invention. As the above fulgide compounds and the above chromene compounds, compounds which are made known by U.S. Pat. No. 4,882,438, U.S. Pat. No. 4,960,678, U.S. Pat. No. 5,130,058 and U.S. Pat. No. 5,106,998 may be advantageously used.

Compounds which were newly found by the inventors of the present invention as compounds having excellent photochromic properties such as compounds disclosed by JP-A 2001-114775, JP-A 2001-031670, JP-A 2001-011067, JP-A 2001-011066, JP-A 2000-347346, JP-A 2000-344762, JP-A 2000-344761, JP-A 2000-327676, JP-A 2000-327675, JP-A 2000-256347, JP-A 2000-229976, JP-A 2000-229975, JP-A 2000-229974, JP-A 2000-229973, JP-A 2000-229972, JP-A 2000-219687, JP-A 2000-219686, JP-A 2000-219685, JP-A 11-322739, JP-A 11-286484, JP-A 11-279171, JP-A 10-298176, JP-A 09-218301, JP-A 09-124645, JP-A 08-295690, JP-A 08-176139 and JP-A 08-157467 may also be advantageously used.

Out of these, photochromic compounds disclosed by WO01/60811, U.S. Pat. No. 4,913,544 and U.S. Pat. No. 5,623,005 may be advantageously used. Out of these photochromic compounds, chromene-based photochromic compounds have higher durability of photochromic properties than other photochromic compounds and much more improved color optical density and fading speed of photochromic properties by the present invention than other photochromic compounds. Therefore, they may be particularly advantageously used.

Further, out of these chromene-based photochromic compounds, compounds represented by the following formula (6) can exhibit especially excellent photochromic properties in the obtained cured product when they are used in combination with the above (meth)acrylic polymerizable monomers. Further, even when a hard coat layer is formed on a cured product comprising the compound represented by the following formula (6), the obtained optical article exhibits excellent photochromic properties and has high adhesion between the hard coat layer and the cured product and high scratch resistance.

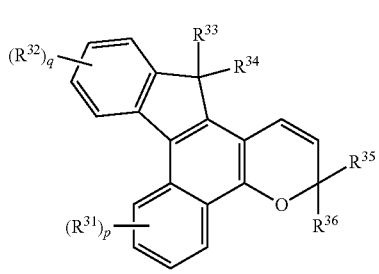

(6)

(Group $R^{31}$)

In the above formula (6), "p" is an integer of 0 to 4, $R^{31}$ is a hydroxyl group, alkyl group, haloalkyl group, cycloalkyl group, alkoxy group, amino group, heterocyclic group having a ring member nitrogen atom and directly bonded to a benzene ring bonded to the nitrogen atom, cyano group, nitro group, formyl group, hydroxycarbonyl group, alkylcarbonyl group, alkoxycarbonyl group, halogen atom, aralkyl group, aryl group, aryloxy group and alkylthio group, and when "p" is 2 to 4, and two adjacent $R^{31}$'s may be bonded together to form an alkylenedioxy group having 1 to 8 carbon atoms.

The above alkyl group is preferably an alkyl group having 1 to 6 carbon atoms. Preferred examples of the alkyl group include methyl group, ethyl group, n-propyl group, isopropyl group, n-butyl group, sec-butyl group, tert-butyl group, n-pentyl group and n-hexyl group.

The above haloalkyl group is preferably a haloalkyl group having 1 to 6 carbon atoms which is substituted by a fluorine atom, chlorine atom or bromine atom. Preferred examples of the haloalkyl group include trifluoromethyl group, pentafluoroethyl group, chloromethyl group, 2-chloroethyl group and bromomethyl group.

The above cycloalkyl group is preferably a cycloalkyl group having 3 to 8 carbon atoms. Preferred examples of the cycloalkyl group include cyclopropyl group, cyclobutyl group, cyclopentyl group and cyclohexyl group.

The above alkoxy group is preferably an alkoxy group having 1 to 6 carbon atoms. Preferred examples of the alkoxy group include methoxy group, ethoxy group, n-propoxy group, isopropoxy group, n-butoxy group, sec-butoxy group and tert-butoxy group.

The above amino group may be a primary amino group, a secondary amino group or a tertiary amino group. Examples of the substituent of the secondary or tertiary amino group include an alkyl group having 1 to 6 carbon atoms, an alkoxy group having 1 to 6 carbon atoms, a cycloalkyl group having 3 to 8 carbon atoms, an aryl group having 6 to 14 carbon atoms and a heteroaryl group having 4 to 12 carbon atoms. Examples of the alkyl group, alkoxy group and cycloalkyl group are the same as those enumerated for $R^{31}$. Examples of the above aryl group include phenyl group, 1-naphthyl group and 2-naphthyl group. Examples of the heteroaryl group include thienyl group, furyl group, pyrrolinyl group, pyridyl group, benzothienyl group, benzofuranyl group and benzopyrrolinyl group. Preferred examples of the amino group include amino group, methylamino group, dimethylamino group, ethylamino group, diethylamino group, phenylamino group and diphenylamino group.

Preferred examples of the above heterocyclic group having a ring member nitrogen atom and directly bonded to a benzene ring bonded to the nitrogen atom include morpholino group, piperidino group, pyrrolidinyl group, piperazino group, N-methylpiperazino group and indolinyl group. Further, the heterocyclic group may have an alkyl group having 1 to 6 carbon atoms as a substituent, and examples of the substituent include an alkyl group such as methyl group. Preferred examples of the heterocyclic group having a substituent include 2,6-dimethylmorpholino group, 2,6-dimethylpiperidino group and 2,2,6,6-tetramethylpiperidino group.

Preferred examples of the above alkylcarbonyl group include acetyl group and ethylcarbonyl group.

Preferred examples of the above alkoxycarbonyl group include methoxycarbonyl group and ethoxycarbonyl group.

Examples of the above halogen atom include fluorine atom, chlorine atom, bromine atom and iodine atom.

The above aralkyl group is preferably an aralkyl group having 7 to 11 carbon atoms. Preferred examples of the aralkyl group include benzyl group, phenylethyl group, phenylpropyl group, phenylbutyl group and naphthylmethyl group.

The above aryl group is preferably an aryl group having 6 to 14 carbon atoms. Preferred examples of the aryl group include phenyl group, 1-naphthyl group and 2-naphthyl group.

The above aryloxy group is preferably an aryloxy group having 6 to 14 carbon atoms. Preferred examples of the aryloxy group include phenoxy group, 1-naphthoxy group and 2-naphthoxy group.

1 to 13 hydrogen atoms, particularly preferably 1 to 4 hydrogen atoms on the aromatic ring such as benzene ring or naphthalene ring of the aralkyl group, the aryl group and aryloxy group may be substituted by the above hydroxyl group, alkyl group, haloalkyl group, cycloalkyl group, alkoxy group, amino group, heterocyclic group having a ring member nitrogen atom and directly bonded to a benzene ring bonded to the nitrogen atom, cyano group, nitro group, formyl group, hydroxycarbonyl group, alkylcarbonyl group, alkoxycarbonyl group or halogen atom.

The above alkylthio group is preferably an alkylthio group having 1 to 6 carbon atoms. Preferred examples of the alkylthio group include methylthio group, ethylthio group, n-propylthio group, isopropylthio group, n-butylthio group, sec-butylthio group, tert-butylthio group, n-pentylthio group and n-hexylthio group.

The alkylenedioxy group formed by bonding two adjacent $R^{31}$'s together is preferably an alkylenedioxy group having 1 to 8 carbon atoms. Preferred examples of the alkylenedioxy group include methylenedioxy group and ethylenedioxy group.

When "p" is 2 to 4, $R^{31}$'s may be the same or different.
(Group $R^{32}$)

In the above formula (6), "q" is an integer of 0 to 4, and $R^{32}$ is a hydroxyl group, alkyl group, haloalkyl group, cycloalkyl group, alkoxy group, amino group, heterocyclic group having a ring member nitrogen atom and directly bonded to a benzene ring bonded to the nitrogen atom, cyano group, nitro group, formyl group, hydroxycarbonyl group, alkylcarbonyl group, alkoxycarbonyl group, halogen atom, aralkyl group, aryl group, aryloxy group or alkylthio group. Examples of these groups are the same as those enumerated for $R^{31}$.

When "q" is 2 to 4, $R^{32}$'s may be the same or different.
(Groups $R^{33}$ and $R^{34}$)

In the above formula (6), $R^{33}$ and $R^{34}$ are each independently a hydrogen atom, hydroxyl group, alkyl group, haloalkyl group, cycloalkyl group, alkoxy group, amino group, heterocyclic group having a ring member nitrogen atom and directly bonded to an indene ring bonded to the nitrogen atom, cyano group, nitro group, formyl group, hydroxycarbonyl group, alkylcarbonyl group, alkoxycarbonyl group, halogen atom, aralkyl group, aryl group or aryloxy group. Examples of these groups are the same as those enumerated for $R^{31}$.

$R^{33}$ and $R^{34}$ may be bonded together to form a ring together with the carbon atom of an indene ring. Examples of the ring include an aliphatic ring having 3 to 20 carbon atoms, a condensation poly ring obtained by condensing an aromatic ring or aromatic hetero ring to the aliphatic ring, a hetero ring having 3 to 20 atoms constituting the ring, and a ring which forms a condensation poly ring obtained by condensing an aromatic ring or aromatic hetero ring to the hetero ring. Preferred examples thereof are given below. In the rings shown below, it should be understood that the carbon atom represented by Z and situated at the lowest position corresponds to the carbon atom bonded to the group $R^{33}$ and the group $R^{34}$.

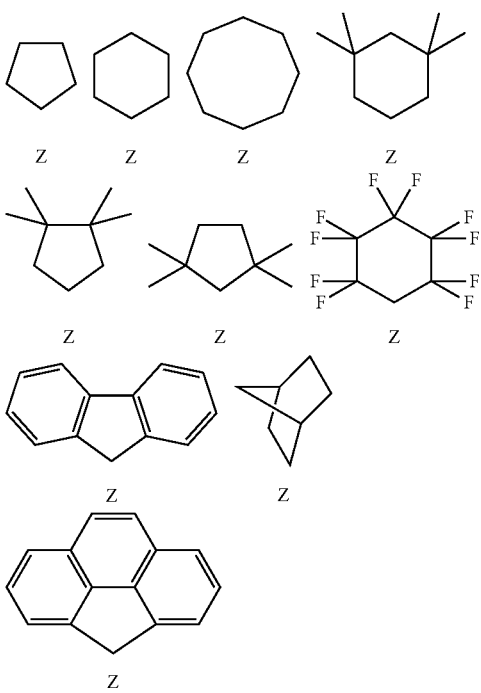

(Groups $R^{35}$ and $R^{36}$)

In the above formula (6), $R^{35}$ and $R^{36}$ are each independently a group represented by the following formula (7), a group represented by the following formula (8), aryl group, heteroaryl group or alkyl group.

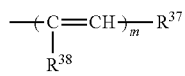

$R^{37}$ in the above formula (7) is an aryl group or a heteroaryl group. Examples of the aryl group are the same as those enumerated for $R^{31}$.

The above heteroaryl group is preferably a heteroaryl group having 4 to 12 carbon atoms. Preferred examples of the heteroaryl group include thienyl group, furyl group, pyrrolinyl group, pyridyl group, benzothienyl group, benzofuranyl group and benzopyrrolinyl group.

1 to 7 hydrogen atoms, particularly preferably 1 to 4 hydrogen atoms of the above heteroaryl group may be substituted by an alkyl group having 1 to 6 carbon atoms, alkoxy group having 1 to 6 carbon atoms, cycloalkyl group having 3 to 8 carbon atoms or halogen atom.

$R^{38}$ is a hydrogen atom, alkyl group or halogen atom. Examples of the alkyl group and the halogen atom are the same as those enumerated for $R^{31}$.

"m" is an integer of 1 to 3. "m" is preferably 1 from the viewpoint of the acquisition of the raw material.

Preferred examples of the group represented by the above formula (7) include phenyl-ethenyl group, (4-(N,N-dimethylamino)phenyl)-ethenyl group, (4-morpholinophenyl)-ethenyl group, (4-piperidinophenyl)-ethenyl group, (4-methoxyphenyl)-ethenyl group, (2-methoxyphenyl)-ethenyl group, phenyl-1-methylethenyl group, (4-methoxyphenyl)-1-methylethenyl group, phenyl-1-fluoroethenyl group, (4-(N,N-dimethylamino)phenyl)-1-fluoroethenyl group, 2-thienyl-ethenyl group, 2-furyl-ethenyl group, 2-(N-methyl)pyrrolinyl-ethenyl group, 2-benzothienyl-ethenyl group, 2-benzofuranyl-ethenyl group and 2-(N-methyl)indolyl-ethenyl group.

In the above formula (8), $R^{39}$ is an aryl group or a heteroaryl group like $R^{37}$. "n" is an integer of 1 to 3. "n" is preferably 1 from the viewpoint of the acquisition ease of the raw material.

Preferred examples of the group represented by the above formula (8) include phenyl-ethynyl group, (4-(N,N-dimethylamino)phenyl)-ethynyl group, (4-morpholinophenyl)-ethynyl group, (4-piperidinophenyl)-ethynyl group, (4-methoxyphenyl)-ethynyl group, (4-methylphenyl)-ethynyl group, (2-methoxyphenyl)-ethynyl group, 2-thienyl-ethynyl group, 2-furyl-ethynyl group, 2-(N-methyl)pyrrolinyl-ethynyl group, 2-benzothienyl-ethynyl group, 2-benzofuranyl-ethynyl group and 2-(N-methyl)indolyl-ethynyl group.

Examples of the aryl group, heteroaryl group and alkyl group represented by $R^{35}$ and $R^{36}$ are the same as those enumerated for $R^{37}$ and $R^{39}$.

$R^{35}$ and $R^{36}$ may be bonded together to form an aliphatic hydrocarbon ring or aromatic hydrocarbon ring together with the carbon atom bonded thereto.

Preferred examples of the aliphatic hydrocarbon ring include adamantane ring, bicyclononane ring and norbornane ring.

Preferred examples of the aromatic hydrocarbon ring include fluorene ring.

At least one, preferably both of the groups $R^{35}$ and $R^{36}$ are preferably aryl groups or heteroaryl groups in order to produce excellent photochromic properties. Further, at least one, preferably both of $R^{35}$ and $R^{36}$ are each particularly preferably any one of the following groups (i) to (iv).

(i) aryl group or heteroaryl group having an alkyl group or an alkoxy group as a substituent, (ii) aryl group or heteroaryl group having an amino group as a substituent, (iii) aryl group or heteroaryl group having a ring member nitrogen atom and a heterocyclic group bonded to the aryl group or heteroaryl group by the nitrogen atom as a substituent, and (iv) aryl group or heteroaryl group having a condensation heterocyclic group having an aromatic hydrocarbon ring or aromatic heterocyclic ring condensed to the heterocyclic group in (iii) as a substituent.

The substitution position of the substituent in the aryl groups (i) to (iv) is not particularly limited, and the number of substituents is not limited. To produce excellent photochromic properties, the substitution position is preferably the 3-position or the 4-position when the aryl group is a phenyl group. The number of substituents is preferably 1 to 2. Preferred examples of the aryl group include 4-methylphenyl group, 4-methoxyphenyl group, 3,4-dimethoxyphenyl group, 4-n-propoxyphenyl group, 4-(N,N-dimethylamino)phenyl group, 4-(N,N-diethylamino)phenyl group, 4-(N,N-diphenylamino)phenyl group, 4-morpholinophenyl group, 4-piperidinophenyl group, 3-(N,N-dimethylamino)phenyl group and 4-(2,6-dimethylpiperidino)phenyl group.

The substitution position of the substituent in the heteroaryl groups (i) to (iv) is not particularly limited, and the number of substituents is not limited. The number of the heteroaryl groups is preferably 1. Preferred examples of the heteroaryl group include 4-methoxythienyl group, 4-(N,N-dimethylamino)thienyl group, 4-methylfuryl group, 4-(N,N-diethylamino)furyl group, 4-(N,N-diphenylamino)thienyl group, 4-morpholinopyrrolinyl group, 6-piperidinobenzothienyl group and 6-(N,N-dimethylamino)benzofuranyl group.

(Preferred Photochromic Compound)

Out of the above photochromic compounds, chromene compounds represented by the following formulas are preferred.

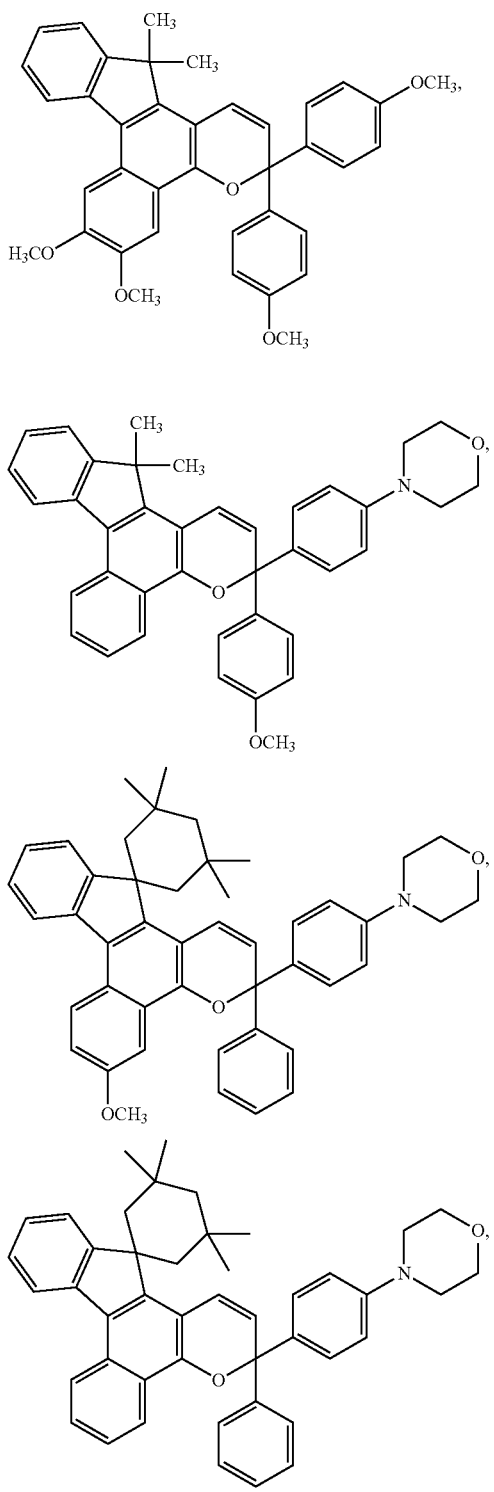

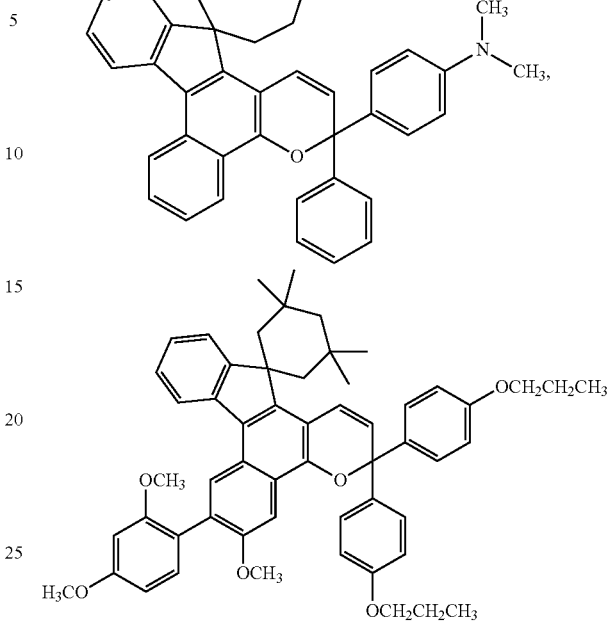

These compounds may be used in combination of two or more to adjust color. A photochromic compound other than these may be mixed and used.

(Content of Photochromic Compound)

In the photochromic curable composition of the present invention, the content of the photochromic compound is 0.01 to 20 parts by mass based on 100 parts by mass of the total of the above (meth)acrylic polymerizable monomers. When the content is lower than 0.01 part by mass, color optical density may become unsatisfactory and when the content is higher than 20 parts by mass, the photochromic compound hardly dissolves in the (meth)acrylic polymerizable monomers, whereby color optical density may become nonuniform. From the viewpoint of an effect, the content of the photochromic compound is preferably 0.05 to 10 parts by mass, particularly preferably 0.1 to 10 parts by mass.

When the photochromic curable composition of the present invention is used as a coating material for optical materials which will be described hereinafter, the content of the photochromic compound is preferably adjusted according to the thickness of a photochromic coating layer to be formed. For example, the content of the photochromic compound is increased to form a thin coating layer and reduced to form a thick coating layer, thereby making it possible to obtain a suitable color optical density. Stated more specifically, it is particularly preferred that the content of the photochromic compound should be 5 to 15 parts by mass to form a coating layer having a thickness of about 10 μm and 0.1 to 5 parts by mass to form a coat layer having a thickness of about 50 μm.

A description is subsequently given of other components used in the photochromic curable composition of the present invention.

(Other Components)

Additives such as a surfactant, an antioxidant, a radical scavenger, a ultraviolet stabilizer, a ultraviolet absorbent, a release agent, a color protection agent, an antistatic agent, a fluorescent dye, a dye, a pigment, an aroma chemical and a plasticizer may be further added to the curable composition of the present invention in order to improve the durability of the photochromic compound, color development speed, fading speed and moldability. It is extremely preferred to add a polymerization initiator which will be described hereinafter to cure the curable composition. As these additives to be added, known compounds may be used without restriction.

Although all nonionic, anionic and cationic surfactants may be used as the surfactant, a nonionic surfactant is preferably used from the viewpoint of solubility in the polymerizable monomers. Examples of the nonionic surfactant which can be advantageously used include sorbitan fatty acid esters, polyethylene glycol fatty acid esters and polyoxyethylene alkyl ethers. A mixture of two or more surfactants may be used. In this case, the total content of the surfactants is preferably 0.1 to 20 parts by mass based on 100 parts by mass of the polymerizable monomer composition.

As the antioxidant, the radical scavenger, the ultraviolet stabilizer and the ultraviolet absorbent may be preferably used hindered amine light stabilizers, hindered phenol antioxidants, phenol-based radical scavengers, sulfur-based antioxidants, benzotriazole-based compounds and benzophenone-based compounds. These antioxidants, radical scavengers, ultraviolet stabilizers and ultraviolet adsorbents may be used in combination of two or more. Further, before use of these nonpolymerizable compounds, a surfactant and an antioxidant, a radical scavenger, an ultraviolet stabilizer or an ultraviolet adsorbent may be used in combination. In this case, the content of the antioxidant, the radical scavenger, the ultraviolet stabilizer or the ultraviolet adsorbent is preferably 0.001 to 20 parts by mass based on 100 parts by mass of the total of the (meth)acrylic polymerizable monomers.

Out of the above stabilizers, hindered amine light stabilizers are useful when the curable composition of the present invention is used as a coating material from the viewpoint of preventing the deterioration of the photochromic compound when the curable composition is cured or improving the durability of a cured product thereof. Known compounds may be used without restriction as the hindered amine light stabilizer. When the curable composition is used as a coating material, compounds which are particularly effective in the prevention of the deterioration of the photochromic compound include bis(1,2,2,6,6-pentamethyl-4-piperidyl)sebacate and the Adecastab LA-52, LA-62, LA-77 and LA-82 of Adeka Corporation. In this case, the content of the hindered amine light stabilizer is preferably 0.001 to 20 parts by mass based on 100 parts by mass of the total of the (meth)acrylic polymerizable monomers. Particularly when the curable composition of the present invention is used as a coating material, the content of the hindered amine optical stabilizer is preferably 0.1 to 10 parts by mass, particularly preferably 1 to 10 parts by mass.

As another useful stabilizer when the curable composition is used as a coating material, a hindered phenol antioxidant is also particularly preferably used from the viewpoint of improving the durability of a cured product. Known compounds may be used without restriction as the hindered phenol antioxidant. When the curable composition is used as a coating material, compounds which are particularly effective in the prevention of the deterioration of the photochromic compound include IRGANOX245 (ethylenebis(oxyethylene)bis[3,5-tert-butyl-4-hydroxy-m-toluoyl]propionate]), IRGANOX 1076 (octadecyl-3-(3,5-di-tert-butyl-4-hydroxyphenyl)propionate) and IRGANOX 1010 (pentaerythritol tetrakis[3-(3,5-di-tert-butyl-4-hydroxyphenyl)propionate] of Ciba Specialty Chemicals Inc. In this case, the content of the compound is preferably 0.001 to 20 parts by mass based on 100 parts by mass of the total of the (meth)acrylic polymerizable monomers. When the curable composition is used as a coating material, the content is preferably 0.1 to 10 parts by mass, more preferably 1 to 10 parts by mass.

The photochromic curable composition of the present invention may comprise another polymerizable monomer different from the above polyfunctional polymerizable monomers (Ia) and the monofunctional polymerizable monomer (Ib) as long as the above characteristic properties are not impaired. The preferred content of the other polymerizable monomer is 10 parts or less by mass based on 100 parts by mass of the total of the above (meth)acrylic polymerizable monomers. The other polymerizable monomer is, for example, a polymerizable monomer having a vinyl group. Examples of the polymerizable monomer containing a vinyl group include styrene, α-methylstyrene and α-methylstyrene dimer. These compounds containing a vinyl group may be used alone or in combination of two or more.

A description is subsequently given of the method of preparing the photochromic curable composition of the present invention, the method of forming a cured product and use of the cured product.

(Preparation Method, Cured Product Forming Method and Use Thereof)

The photochromic curable composition of the present invention can be prepared, for example, by weighing predetermined amounts of components and mixing them together. The order of adding the components is not particularly limited. All the components may be added at the same time, or only the (meth)acrylic polymerizable monomers may be premixed together and then the photochromic compound and other additives may be added to and mixed with the resulting mixture right before polymerization as will be described hereinafter. As will be described hereinafter, it is also preferred to further add a polymerization initiator for polymerization as required.

The photochromic curable composition of the present invention preferably has a viscosity at 25° C. of 20 to 500 cp. This viscosity is preferred when the photochromic curable composition is used as a coating gent for an optical material, more preferably 50 to 300 cp, particularly preferably 60 to 200 cp.

Within this viscosity range, the thickness of the coating layer which will be described hereinafter can be easily adjusted to 10 to 100 µm and satisfactory photochromic properties can be obtained.

To obtain a photochromic cured product by curing the photochromic curable composition of the present invention, a known polymerization method may be employed according to the types of the polymerizable monomers in use. Polymerization initiating means include use of a radical polymerization initiator such as peroxide or azo compound, the application of ultraviolet radiation, α-ray, β-ray or γ-ray, or a combination thereof.

A known radical polymerization initiator may be used. Typical examples of a thermal polymerization initiator include diacyl peroxides such as benzoyl peroxide, p-chlorobenzoyl peroxide, decanoyl peroxide, lauroyl peroxide and acetyl peroxide; peroxy esters such as t-butyl peroxy-2-ethyl hexanoate, t-butyl peroxy dicarbonate, cumyl peroxy neodecanoate and t-butyl peroxy benzoate; percarbonates such as diisopropyl peroxydicarbonate, di-2-ethylhexyl peroxydicarbonate and di-sec-butyl peroxycarbonate; and azo compounds such as 2,2'-azobisisobutyronitrile, 2,2'-azobis(4-dimethylvaleronitrile), 2,2'-azobis(2-methylbutyronitrile) and 1,1'-azobis(cyclohexane-1-carbonitrile).

When these thermal polymerization initiators are used, the amount thereof differs according to polymerization conditions, the type of the initiator, and the types and compositions of the polymerizable monomers and cannot be limited unconditionally. It is preferably 0.01 to 10 parts by mass based on 100 parts by mass of the total of the polymerizable monomers (when another polymerizable monomer is used, this polymerizable monomer is included). The above thermal polymerization initiators may be used alone or in combination of two or more.

When the curable composition is polymerized by exposure to ultraviolet radiation, it is preferred to use a photopolymerization initiator such as benzoin, benzoin methyl ether, benzoin butyl ether, benzophenol, acetophenone 4,4'-dichlorobenzophenone, diethoxy acetophenone, 2-hydroxy-2-methyl-1-phenylpropan-1-one, benzyl methyl ketal, 1-(4-isopropylphenyl)-2-hydroxy-2-methylpropan-1-one, 1-hydroxycyclohexylphenyl ketone, 2-isopropyl thioxanthone, bis(2,6-dimethoxybenzoyl-2,4,4-trimethyl-pentylphosphine oxide, bis(2,4,6-trimethylbenzoyl)-phenylphosphine oxide, 2,4,6-trimethylbenzoyl diphenylphosphine oxide or 2-benzyl-2-dimethylamino-1-(4-morpholinophenyl)-butanone-1.

When these photopolymerization initiators are used, the amount thereof is preferably 0.001 to 5 parts by mass based on 100 parts by mass of the total of the polymerizable monomers (when another polymerizable monomer is used, this polymerizable monomer is included). The above photopolymerization initiators may be used alone or in combination. The above thermal polymerization initiator may be used in combination with the photopolymerization initiator.

As the particularly preferred method for obtaining a cured product from the photochromic curable composition of the present invention, the photochromic curable composition of the present invention comprising the above photopolymerization initiator is exposed to ultraviolet radiation to be cured and further heated as required to complete its polymerization.

To polymerize the photochromic curable composition of the present invention through exposure to ultraviolet radiation, known light sources may be used without restriction. Examples thereof include a super high-pressure mercury lamp, a high-pressure mercury lamp, a low-pressure mercury lamp, a xenon lamp, a carbon arc, a sterilization lamp, a metal halide lamp and an electrodeless lamp. The time of exposure using the light source may be suitably determined according to the type, absorption wavelength and sensitivity of the above photopolymerization initiator and the thickness of a photochromic layer. When an electron beam is used as the light source, a photochromic layer can be cured without adding a photopolymerization initiator.

Although the photochromic curable composition of the present invention may be used alone as a photochromic material by curing with the above polymerization initiator, it is particularly preferably used as a coating material for coating a substrate such as an optical substrate, preferably an eyeglass lens.

An example in which the photochromic curable composition of the present invention is used as a coating material is described hereinunder.

(Use as a Coating Material)

Examples of the optical material include known optical substrates such as eyeglass lenses and windows for houses and automobiles.

Known eyeglass lenses include plastic eyeglass lenses such as (meth)acrylic resin-based, polycarbonate-based resin, allyl-based resin, thiourethane-based resin, urethane-based resin and thioepoxy-based resin eyeglass lenses, and glass eyeglass lenses. When the curable composition of the present invention is used as a coating material for eyeglass lenses, it can be used for any eyeglass lens but preferably used as a coating material for plastic eyeglass lenses, particularly preferably for (meth)acrylic resin-based, polycarbonate-based resin, allyl-based resin, thiourethane-based resin, urethane-based resin and thioepoxy-based resin eyeglass lenses.

When the curable composition of the present invention is used as a coating material for optical substrates such as eyeglass lenses, preferably, the photochromic curable composition of the present invention is applied to the optical substrate by spin coating, spray coating, dip coating or dip-spin coating and then preferably cured by exposure to light or heating. More preferably, it is cured by exposure to light and then heated to complete its polymerization. When the optical substrate is to be coated with the curable composition, a pretreatment which will be described hereinafter is preferably made on the optical substrate in advance.

When the photochromic curable composition of the present invention is used as a coating material, the curable composition is applied to the surface of the above optical substrate to form a coating layer which is then polymerized and cured to form a photochromic layer. In this case, prior to coating, a pretreatment is preferably made on the optical substrate so as to improve the wettability of the optical substrate by the curable composition and the adhesion of the optical substrate. Examples of this pretreatment include a chemical treatment with a basic aqueous solution or an acidic aqueous solution, polishing with an abrasive, a plasma treatment using atmospheric-pressure plasma or low-pressure plasma, a corona discharge treatment and a UV ozone treatment. These methods are not particularly limited and known methods may be used or combined to improve the adhesion of the optical substrate.

Out of the above pretreatments, a chemical treatment with a basic aqueous solution is preferred as the pretreatment of the above-described eyeglass lens substrate (optical substrate) because it can be easily employed. When the photochromic curable composition of the present invention is used, it can strengthen adhesion between it and the optical substrate. As for the treatment method, in general, the optical substrate should be impregnated with an alkaline solution. A sodium hydroxide aqueous solution or a potassium hydroxide aqueous solution is used as the alkaline solution. The concentration of the hydroxide is preferably 5 to 30 mass %. The treatment temperature may be suitably determined in consideration of the heat resistance of the substrate in use but preferably 20 to 60° C. The treatment is carried out by impregnating the optical substrate with an alkaline aqueous solution or by carrying out ultrasonic cleaning while the optical substrate is impregnated with an alkaline aqueous solution. The treatment time which differs according to treatment conditions is preferably 1 minute to 1 hour, more preferably 5 to 15 minutes. The alkaline solution may be water, a mixed solution of alcohol solvents or an alcohol solution besides an aqueous solution. The alcohol in use is a lower alcohol such as methanol, ethanol or isopropyl alcohol, or a solution prepared by adding 1 to 10 parts by mass of an organic base such as 1-methyl-2-pyrrolidone to 100 parts by mass of the alkaline solution. After the alkaline treatment, the optical substrate should be rinsed with water such as pure water, ion exchange water or distilled water and dried.

Prior to the formation of a coating layer by applying the photochromic curable composition to the surface of the optical substrate, a polyurethane-based, polyester-based, polyvinyl acetal-based or epoxy-based primer may be applied and cured.

A photochromic coating layer can be formed by applying the coating material to the optical substrate which has undergone the above pretreatment and curing it in accordance with the above method. The coating layer obtained by the above method is preferably made relatively thick so that sufficiently high color optical density is obtained and the durability of photochromic properties becomes high even when the content of the photochromic compound is low. However, when the coating layer is thick, initial yellowness increases. Therefore, the thickness of the coating layer is preferably 10 to 100 µm, more preferably 20 to 50 µm. This large coating thickness can be easily attained by setting the viscosity at 25° C. of the photochromic curable composition to 20 to 500 cp, preferably 50 to 300 cp, more preferably 60 to 200 cp.

When the photochromic curable composition of the present invention is used as a coating material for eyeglass lenses, it is preferred to adjust the ratio of components to be mixed together, especially the ratio of polymerizable monomers to ensure that the refractive index of a cured product of the photochromic curable composition becomes almost equal to the refractive index of an eyeglass lens. In general, the refractive index is adjusted to about 1.48 to 1.75.

The optical substrate which has been coated as described above can be used as a photochromic optical material directly but generally used after it is coated with a hard coat layer. Thereby, the scratch resistance of the photochromic optical material can be improved.

Known coating materials may be used without restriction as the coating material (hard coat agent) for forming a hard coat layer. Specific examples of the coating material include silane coupling agents, hard coat agents comprising a sol of silicon oxide, zirconium oxide, antimony oxide, aluminum oxide or titanium oxide as the main component, and hard coat agents comprising an organic polymer as the main component.

The coated photochromic optical material is generally coated with a hard coat agent by the same operation as the coating of the optical substrate with the photochromic curable composition. Similarly, after the pretreatment of the photochromic optical material, that is, the soak of the photochromic optical material in an alkaline solution such as a sodium hydroxide aqueous solution or a potassium hydroxide aqueous solution, or ultrasonic cleaning while the photochromic optical material is soaked with the alkaline solution, the hard coat agent may be applied to the surface of the optical material by the above known method. The applied hard coat agent is cured by a known method, for example, heating to form a hard coat layer.

When the hard coat layer is to be formed on a cured product of the photochromic curable composition of the present invention, a hard coat layer having sufficiently high adhesion can be formed without carrying out polishing with an abrasive, a plasma treatment using atmospheric-pressure plasma or low-pressure plasma, a corona discharge treatment or a UV ozone treatment. As a matter of course, the adhesion of the hard coat layer can be further improved by carrying out the above treatment.

Processing and a secondary treatment such as antireflection treatment and antistatic treatment by depositing a thin film of a metal oxide such as $SiO_2$, $TiO_2$ or $ZrO_2$ or by forming a thin coating film of an organic polymer may be made on the surface of a cured product of the photochromic curable composition alone of the present invention, an optical material having a coating layer made of the curable composition (coating material) on the surface of an optical substrate, the coating layer or an optical article having a hard coat layer.

EXAMPLES

The following examples are provided for the purpose of further illustrating the present invention but are in no way to be taken as limiting. Symbols and names of compounds in use are shown below.

(Ia) Polyfunctional Polymerizable Monomers Having Two to Four (Meth)Acrylic Groups in One Molecule Bifunctional Polymerizable Monomer Having Two Methacrylic Groups in One Molecule BPE100: 2,2-bis(4-methacryloyloxypolyethoxyphenyl)propane (the average number of recurring ethyleneoxy groups is 2.6, average molecular weight is 478)

BPE500: 2,2-bis(4-methacryloyloxypolyethoxyphenyl)propane (the average number of recurring ethyleneoxy groups is 10, average molecular weight is 804)

9G: polyethylene glycol dimethacrylate (the average number of recurring ethyleneoxy groups is 9, average molecular weight is 536)

14G: polyethylene glycol dimethacrylate (the average number of recurring ethyleneoxy groups is 14, average molecular weight is 770)

Bifunctional Polymerizable Monomer Having Two Acrylic Groups in One Molecule

A-BPE: 2,2-bis(4-acryloyloxypolyethoxyphenyl)propane (the average number of recurring ethyleneoxy groups is 10, average molecular weight is 776)

9GA: polyethylene glycol diacrylate (the average number of recurring ethyleneoxy groups is 9, average molecular weight is 508)

Urethane Acrylate Having Two Acrylic Groups in One Molecule

UA-500: bifunctional urethane acrylate obtained by reacting 3,3,6-trimethylhexamethylenediamine with hydroxyethoxyethyl acrylate in a ratio of 1:2 (molecular weight is 516)

Trifunctional Polymerizable Monomer Having Three Methacrylic Groups in One Molecule TMPT: trimethylolpropane trimethacrylate (molecular weight is 338)

Tetrafunctional Polymerizable Monomer Having Four Acrylic Groups in One Molecule A-TMMT: pentaerythritol tetraacrylate (molecular weight is 352)

(Ib) Monofunctional Polymerizable Monomer Having One (Meth)Acrylic Group in One Molecule Monofunctional Polymerizable Monomer Having One Methacrylic Group in One Molecule GMA: glycidyl methacrylate (molecular weight is 142)

TMSiMA: γ-methacryloyloxypropyl trimethoxysilane (molecular weight is 252)

MePEGMA: methyl ether polyethylene glycol methacrylate (the average number of recurring ethyleneoxy groups is 23, average molecular weight is 1068)

Monofunctional Polymerizable Monomer Having One Acrylic Group in One Molecule

GA: glycidyl acrylate (molecular weight is 128)

(Others) Polymerizable Monomer Having Six (Meth)Acrylic Groups in One Molecule
U6HA: urethane oligomer hexaacrylate (average molecular weight is 1019)
(II) Photochromic Compound

PC1

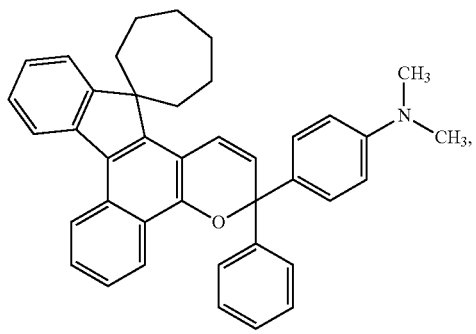

PC2

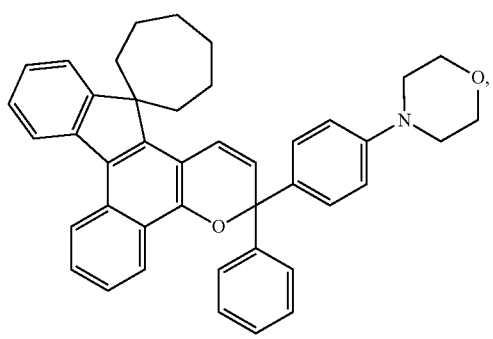

PC3

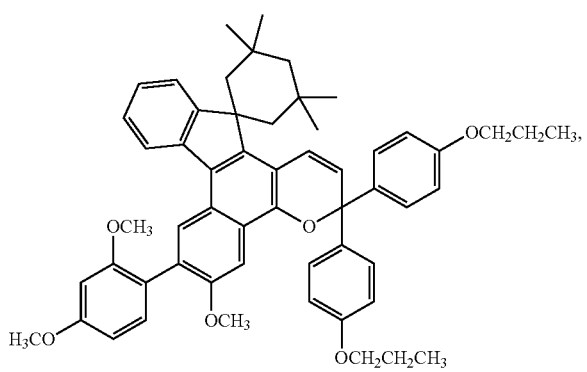

PC4

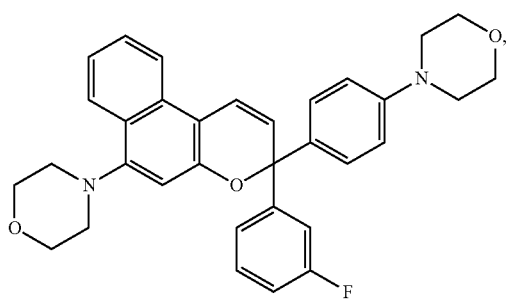

Polymerization Initiator
CGI1800: a mixture of 1-hydroxycyclohexylphenyl ketone and bis(2,6-dimethoxybenzoyl-2,4,4-trimethyl-pentylphosphine oxide) (weight ratio of 3:1)

Hard Coat Agent
Hard coat liquid A (a mixture of 50 parts by mass of methanol dispersed $SnO_2$—$ZrO_2$—$Sb_2O_5$—$SiO_2$ composite metal oxide (HX-305M5 of Nissan Chemical Industries, Ltd.), 12 parts by mass of γ-glycidoxypropyl trimethoxysilane, 3 parts by mass of methyl triethoxysilane, 10 parts by mass of tetraethoxysilane, 7 parts by mass of 0.05 N hydrochloric acid, 7 parts by mass of tert-butyl alcohol, 10 parts by mass of isopropyl alcohol and 1 part by mass of tris(acetylacetonato) aluminum)
Hindered Amine Optical Stabilizer
LS765: bis(1,2,2,6,6-pentamethyl-4-piperidyl)sebacate Hindered phenol antioxidant
IRGANOX245: ethylenebis(oxyethylene)bis[3,5-tert-butyl-4-hydroxy-m-toluoyl]propionate]

Example 1

3 parts by mass of PC1 as a photochromic compound was added to and fully mixed with 100 parts by mass of (meth)acrylic polymerizable monomers consisting of 50 parts by mass of BPE500 having methacrylic groups, 30 parts by mass of TMPT having methacrylic groups and 17 parts by mass of 9GA having acrylic groups as the polyfunctional polymerizable monomers (Ia) and 3 parts by mass of GMA having a methacrylic group as the monofunctional polymerizable monomer (Ib) to obtain a photochromic curable composition. The total content of the polyfunctional polymerizable monomers (Ia) in the (meth)acrylic polymerizable monomers of this photochromic curable composition was 97 mass % and the number of moles of the methacrylic group existent in the (meth)acrylic polymerizable monomers was 6.3 times the number of moles of the acrylic group. 5 parts by mass of LS765 as an light stabilizer, 3 parts by mass of IRGANOX245 as an antioxidant and 0.5 part by mass of CGI1800 as a polymerization initiator were added to and fully mixed with the photochromic curable composition. Then, about 2 g of the mixed solution (coating material) obtained by the above method was applied to the surface of a 2 mm-thick plastic lens (MR: thiourethane-based resin plastic lens; optical substrate having a refractive index of 1.60) with the 1H-DX2 spin coater of MIKASA at a revolution of 60 rpm for 40 seconds, at 500 rpm for 2 seconds and at 1,000 rpm for 5 seconds. This coated lens was illuminated by a metal halide lamp having an output of 100 mW/cm² in a nitrogen gas atmosphere for 150 seconds to cure the coating film. Thereafter, the cured coating film was heated at 120° C. for 1 hour to manufacture an optical material having a photochromic coating layer.

Subsequently, the optical lens (optical material) having a photochromic coating layer (thickness of 40 μm) obtained by the above method was washed with acetone and fully dried with wind to be made clean, soaked in a 10 wt % NaOH aqueous solution for 10 minutes, rinsed in water completely and then dried with air again. This optical lens was immersed in the hard coat liquid A, pulled up at 30 mm/min, pre-dried at 60° C. for 15 minute and thermally cured at 110° C. for 2 hours to obtain an optical article having a hard coat layer. The photochromic properties shown in (1) to (4) below of this optical article, and adhesion between the photochromic coating layer and the hard coat layer and the scratch resistance of the hard coat layer shown in (5) and (6) below were evaluated.

(1) Maximum absorption wavelength ($\lambda_{max}$): The obtained lens having a photochromic coating layer was irradiated by the L-2480 (300W) SHL-100 xenon lamp of Hamamatsu Photonics K.K. through an aeromass filter (manufactured by Corning Co., Ltd.) at 20° C.±1° C. at a beam intensity on the surface of the photochromic coating layer of 2.4 mW/cm² at 365 nm and 24 μW/cm² at 245 nm for 120 seconds to develop color, and the maximum absorption wavelength at this point was obtained by means of the spectrophotometer (MCPD3000 instantaneous multi-channel photodetector) of Otsuka Electronics Co., Ltd. The maximum absorption wavelength is connected with color at the time of color development.

(2) Color optical density: This is the difference between absorbance {ϵ(120)} after 120 seconds of exposure and absorbance ϵ(0) under no exposure of a cured product at the above maximum absorption wavelength. It can be said that as this value becomes larger, photochromic properties become more excellent.

(3) Fading half period: time {τ½(min)} required for the reduction of the absorbance at the above maximum absorption wavelength of the cured product to ½ of {ϵ(120)−ϵ(0)} when exposure is stopped after 120 seconds of exposure. It can be said that as this time becomes shorter, the fading speed becomes higher and photochromic properties become more excellent.

(4) Durability: To evaluate the durability of color development by exposure, the following deterioration promotion test was conducted. That is, the deterioration of the obtained lens having a photochromic coating layer was promoted by using the X25 xenon weather meter of Suga Test Instruments Co., Ltd. for 200 hours. Thereafter, the above color optical density was evaluated before and after the test to measure the color optical density ($A_0$) before the test and the color optical density ($A_{200}$) after the test so as to obtain the value {($A_{200}/A_0$)×100} as the residual rate (%). As the residual rate becomes higher, the durability of color development becomes higher. The above fading half period was evaluated before and after the test to measure the fading half period ($T_0$) before the test and the fading half period ($T_{200}$) after the test so as to obtain the value {($T_{200}/T_0$)×100} as the delay rate (%) of fading speed.

(5) Adhesion between photochromic coating layer and hard coat layer: The surface (covered with a hard coat layer) on the photochromic coating layer side of the hard coated lens was cut with a cutter knife having a sharp edge to form 100 squares measuring 1 mm×1 mm, commercially available cellophane tape (registered trademark) was affixed to the surface, and separation between the hard coat layer and the photochromic coating layer when the cellophane tape was stripped quickly was checked visually. Adhesion between the photochromic coating layer and the hard coat layer was evaluated based the number of remaining squares (100 (none removed) to 0 (all removed)).

(6) Scratch resistance of hard coat layer: Steel wool (Bonstar #0000 of Nippon Steel Wool Co., Ltd.) was used to rub the surface of the lens 10 times under a load of 1 kg so as to evaluate how much it was scratched visually. The evaluation criteria are as follows.

A: rarely scratched (less than 5 scratches are seen)
B: slightly scratched (5 or more to less than 10 scratches are seen)
C: scratched (10 or more to less than 20 scratches are seen)
D: scratched heavily (20 or more scratches are seen)

The composition of the photochromic curable composition of Example 1 is shown in Table 1, and the evaluation results of the above properties are shown in Table 4. As shown in Table 4, good results were obtained for all the properties.

Even when the same evaluations were made on the above photochromic curable composition which had been put in a brown glass container and kept at 40° C. for 3 months, good results were obtained for all the properties.

Examples 2 to 13

The operation of Example 1 was repeated to evaluate the physical properties except that the photochromic curable compositions shown in Tables 1 to 3 were used. The results are shown in Table 4. As shown in Table 4, good results were obtained for all the properties.

Even when the same evaluations were made on the above photochromic curable compositions which had been put in a brown glass container and kept at 40° C. for 3 months, good results were obtained for all the properties.

TABLE 1

| Ex. No. | | Polymerizable monomers having methacrylic group(s) (parts by mass) | Polymerizable monomers having acrylic group(s) (parts by mass) | Photochromic compound (parts by mass) | Value obtained by dividing the number of moles of methacrylic group by the number of moles of acrylic group existent in polymerizable monomers |
|---|---|---|---|---|---|
| 1 | monofunctional | GMA(3) | — | PC3(3) | 6.3 |
|   | difunctional | BPE500(50) | 9GA(17) | | |
|   | trifunctional | TMPT(30) | — | | |
| 2 | monofunctional | GMA(5) | — | PC3(3) | 3.9 |
|   | difunctional | BPE500(45) | 9GA(25) | | |
|   | trifunctional | TMPT(25) | — | | |
| 3 | monofunctional | — | GA(3) | PC3(3) | 4.1 |
|   | difunctional | BPE500(47) | A-BPE(5)/9GA(15) | | |
|   | trifunctional | TMPT(30) | — | | |
| 4 | monofunctional | GMA(1) | — | PC3(3) | 4.7 |
|   | difunctional | BPE500(40)/14G(6) | A-BPE(5)/9GA(18) | | |
|   | trifunctional | TMPT(30) | — | | |
| 5 | monofunctional | GMA(1)/TMSiMA(6) | — | PC3(3) | 5.0 |
|   | difunctional | BPE500(38)/14G(5) | A-BPE(5)/9GA(17) | | |
|   | trifunctional | TMPT(28) | | | |

TABLE 2

| Ex. No. | Polymerizable monomers | | Photochromic compound (parts by mass) | Value obtained by dividing the number of moles of methacrylic group by the number of moles of acrylic group existent in polymerizable monomers |
|---|---|---|---|---|
| | Polymerizable monomers having methacrylic group(s) (parts by mass) | Polymerizable monomers having acrylic group(s) (parts by mass) | | |
| 6 | monofunctional GMA(5)<br>difunctional BPE100(37)/BPE500(15)/9G(30)<br>trifunctional TMPT(3)<br>tetrafunctional — | —<br>—<br>—<br>A-TMMT(10) | PC3(3) | 3.2 |
| 7 | monofunctional GMA(12)/MePEGMA(8)<br>difunctional BPE500(35)<br>trifunctional TMPT(25) | —<br>A-BPE(5)/9GA(15)<br>— | PC3(3) | 5.7 |
| 8 | monofunctional GMA(10)<br>difunctional 9G(40)<br>trifunctional TMPT(30) | —<br>A-BPE(10)/9GA(10)<br>— | PC3(3) | 6.1 |
| 9 | monofunctional GMA(5)<br>difunctional BPE500(30)<br>trifunctional TMPT(45) | —<br>9GA(20)<br>— | PC3(3) | 6.6 |

TABLE 3

| Ex. No. | Polymerizable monomers | | Photochromic compound (parts by mass) | Value obtained by dividing the number of moles of methacrylic group by the number of moles of acrylic group existent in polymerizable monomers |
|---|---|---|---|---|
| | Polymerizable monomers having methacrylic group(s) (parts by mass) | Polymerizable monomers having acrylic group(s) (parts by mass) | | |
| 10 | monofunctional GMA(5)<br>difunctional BPE500(40)<br>trifunctional TMPT(30) | —<br>UA-500(25)<br>— | PC3(3) | 4.1 |
| 11 | monofunctional —<br>difunctional BPE100(50)<br>trifunctional TMPT(30) | —<br>9GA(20)<br>— | PC3(3) | 5.1 |
| 12 | monofunctional GMA(1)<br>difunctional BPE500(40)/9G(6)<br>trifunctional TMPT(30) | —<br>A-BPE(5)/9GA(18)<br>— | PC1(0.5)<br>PC2(0.5)<br>PC3(2) | 4.8 |
| 13 | monofunctional GMA(1)<br>difunctional BPE500(40)/9G(6)<br>trifunctional TMPT(30) | —<br>A-BPE(5)/9GA(18)<br>— | PC1(0.3)<br>PC2(0.5)<br>PC3(1.5)<br>PC4(0.5) | 4.8 |

TABLE 4

| Ex. No. | Photochromic properties | | | | | Hard coat properties | |
|---|---|---|---|---|---|---|---|
| | Maximum absorption wavelength ($\lambda$max) | Color optical density (Abs) | Fading half period (sec) | Durability residual rate (%) | Durability delay of fading speed (%) | Adhesion | Scratch resistance |
| 1 | 450 nm<br>573 nm | 1.02<br>1.02 | 62 | 84 | 105 | 97 | A |
| 2 | 450 nm<br>573 nm | 0.98<br>0.98 | 69 | 80 | 108 | 100 | B |
| 3 | 451 nm<br>574 nm | 0.94<br>0.94 | 63 | 82 | 107 | 100 | A |
| 4 | 451 nm<br>574 nm | 1.05<br>1.05 | 68 | 85 | 105 | 100 | A |
| 5 | 451 nm<br>574 nm | 1.05<br>1.05 | 63 | 86 | 103 | 100 | A |
| 6 | 450 nm<br>573 nm | 0.86<br>0.85 | 76 | 82 | 107 | 100 | B |
| 7 | 450 nm<br>573 nm | 0.84<br>0.84 | 60 | 80 | 108 | 100 | A |
| 8 | 451 nm<br>574 nm | 0.91<br>0.92 | 59 | 81 | 108 | 99 | A |

TABLE 4-continued

| | Photochromic properties | | | | | Hard coat properties | |
|---|---|---|---|---|---|---|---|
| Ex. No. | Maximum absorption wavelength (λmax) | Color optical density (Abs) | Fading half period (sec) | Durability residual rate (%) | Durability delay of fading speed (%) | Adhesion | Scratch resistance |
| 9 | 451 nm | 0.92 | 62 | 89 | 114 | 95 | A |
|   | 574 nm | 0.92 | 62 | 88 | 114 | | |
| 10 | 451 nm | 0.94 | 64 | 82 | 104 | 100 | A |
|    | 574 nm | 0.93 | 65 | 82 | 104 | | |
| 11 | 451 nm | 0.95 | 59 | 74 | 106 | 100 | A |
|    | 574 nm | 0.96 | | | | | |
| 12 | 451 nm | 0.80 | 66 | 85 | 105 | 100 | A |
|    | 574 nm | 1.05 | 66 | 85 | 104 | | |
| 13 | 465 nm | 1.05 | 63 | 84 | 103 | 100 | A |
|    | 574 nm | 0.83 | 66 | 86 | 103 | | |

Comparative Examples 1 to 4

The operation of Example 1 was repeated to evaluate the properties except that the photochromic curable compositions shown in Table 5 were used. The results are shown in Table 6.

TABLE 5

| | Polymerizable monomers | | | | Value obtained by dividing the number of moles of methacrylic group by the number of moles of acrylic group existent in polymerizable monomers |
|---|---|---|---|---|---|
| C. Ex. No. | | Polymerizable monomers having methacrylic group(s) (parts by mass) | Polymerizable monomers having acrylic group(s) (parts by mass) | Photochromic compound (parts by mass) | |
| 1 | monofunctional | GMA(3) | — | PC3(3) | 11.2 |
|   | difunctional | BPE500(57) | 9GA(10) | | |
|   | trifunctional | TMPT(30) | — | | |
| 2 | monofunctional | GMA(5) | — | PC3(3) | 2.4 |
|   | difunctional | BPE500(25) | 9GA(40) | | |
|   | trifunctional | TMPT(30) | — | | |
| 3 | monofunctional | GMA(5)/MePEGMA(30) | — | PC3(3) | 4.4 |
|   | difunctional | BPE500(40) | 9GA(15) | | |
|   | trifunctional | TMPT(10) | — | | |
| 4 | monofunctional | GMA(5) | — | PC3(3) | 3.2 |
|   | difunctional | BPE500(50) | — | | |
|   | trifunctional | TMPT(25) | — | | |
|   | hexafunctional | — | U6HA(20) | | |

TABLE 6

| | Photochromic properties | | | | | Hard coat properties | |
|---|---|---|---|---|---|---|---|
| C. Ex. No. | Maximum absorption wavelength (λmax) | Color optical density (Abs) | Fading half period (sec) | Durability residual rate (%) | Durability delay of fading speed (%) | Adhesion | Scratch resistance |
| 1 | 450 nm | 0.89 | 71 | 84 | 105 | 0 | A |
|   | 573 nm | 0.88 | | | | | |
| 2 | 450 nm | 0.96 | 60 | 82 | 107 | 100 | D |
|   | 573 nm | 0.95 | | | | | |
| 3 | 451 nm | 0.79 | 54 | 78 | 107 | 100 | C |
|   | 574 nm | 0.79 | | | | | |
| 4 | 451 nm | 0.94 | 68 | 83 | 143 | 100 | B |
|   | 574 nm | 0.93 | | | | | |

C. Ex.: Comparative Example

In Comparative Example 1, the number of moles of the methacrylic group existent in the (meth)acrylic polymerizable monomers was 11.2 times the number of moles of the acrylic group. A lens having a photochromic coating manufactured by using this photochromic curable composition had a problem with the adhesion of the hard coat layer.

In Comparative Example 2, the number of moles of the methacrylic group existent in the (meth)acrylic polymerizable monomers was 2.4 times the number of moles of the acrylic group. A lens having a photochromic coating manufactured by using this photochromic curable composition had a problem with the scratch resistance of the hard coat layer.

In Comparative Example 3, the total content of the polymerizable monomers having two to four (meth)acrylic groups in the (meth)acrylic polymerizable monomers was 65 mass %. Therefore, a lens having a photochromic coating manufactured by using this photochromic curable composition had a problem with the scratch resistance of the hard coat layer.

In Comparative Example 4, a polymerizable monomer having six (meth)acrylic groups was used. In this curable composition, no acrylic group was existent in 100 parts by mass of the total of the monofunctional polymerizable monomer having one (meth)acrylic group in one molecule and the polyfunctional polymerizable monomers having two to four (meth)acrylic groups in one molecule. A lens having a photochromic coating manufactured by using this photochromic curable composition had a delay in fading.

EFFECT OF THE INVENTION

Crosslinking density is increased by setting the total content of polymerizable monomers having two to four (meth)acrylic groups to a specific value, thereby making it possible to obtain excellent photochromic properties such as high color optical density and high fading speed without being much influenced by temperature.

Further, a narrow micro-space that prevents the color development of a photochromic compound due to the gradual polymerization and curing of an unpolymerized part when it is used for a long time is rarely formed by setting the total content of polymerizable monomers having two to four (meth)acrylic groups to a specific value, thereby making it possible to prevent a delay in fading.

Moreover, since the ratio of the methacrylic group to the acrylic group is set to a specific value, there can be formed a photochromic coating layer having the characteristic properties of a cured product of a polymerizable monomer having methacrylic groups from which high scratch resistance is obtained after the formation of a hard coat layer and the characteristic properties of a cured product of a polymerizable monomer having acrylic groups which is easily etched and can obtain high adhesion.

Since the photochromic curable composition of the present invention has high storage stability itself in addition to the above characteristic properties, it is of great industrial utility value.

The invention claimed is:

1. A photochromic curable composition comprising (I) 100 parts by mass of (meth)acrylic polymerizable monomers and (II) 0.01 to 20 parts by mass of a photochromic compound, wherein 100 parts by mass of the (meth)acrylic polymerizable monomers consist of (Ia) 70 to 100 parts by mass of a polyfunctional polymerizable monomer having two to four (meth)acrylic groups in one molecule and (Ib) 0 to 30 parts by mass of a monofunctional polymerizable monomer having one (meth)acrylic group in one molecule; and methacrylic groups and acrylic groups in the (meth)acrylic polymerizable monomers are existent to ensure that the number of moles of the methacrylic group is 3 to 7 times the number of moles of the acrylic group, and the polyfunctional polymerizable monomer (Ia) consists of 60 to 80 mass % of a bifunctional polymerizable monomer having two (meth)acrylic groups, 20 to 40 mass % of a trifunctional polymerizable monomer having three (meth)acrylic groups, and 0 to 20 mass % of a tetrafunctional polymerizable monomer having four (meth) acrylic groups, wherein the total of the bifunctional polymerizable monomer, the trifunctional polymerizable monomer and the tetrafunctional polymerizable monomer is 100 mass %.

2. The photochromic curable composition according to claim 1, wherein the photochromic compound (II) contains a compound having an indeno[2,1-f]naphtho [1,2-b]pyran skeleton.

3. A coating material comprising the photochromic curable composition of claim 1.

4. An optical material having a photochromic coating layer obtained by curing the coating material of claim 3 on at least one side of an optical substrate.

5. A photochromic cured product obtained by curing the photochromic curable composition of claim 1.

* * * * *